United States Patent [19]

Dietz

[11] Patent Number: 4,729,604
[45] Date of Patent: Mar. 8, 1988

[54] BICYCLE WHEEL SHROUD

[75] Inventor: Timothy J. Dietz, West Carrollton, Ohio

[73] Assignee: Huffy Corporation, Miamisburg, Ohio

[21] Appl. No.: 932,436

[22] Filed: Nov. 18, 1986

[51] Int. Cl.$^4$ .............................................. B60B 7/00
[52] U.S. Cl. .................................. 301/37 R; 301/37 P; 301/37 SA; 301/37 S
[58] Field of Search ................ 301/37 R, 37 P, 37 S, 301/37 SA, 37 T, 37 ST, 37 CM; 280/156; 350/97, 99

[56] References Cited

U.S. PATENT DOCUMENTS

| | | | |
|---|---|---|---|
| D. 121,717 | 7/1940 | Herold . | |
| D. 157,822 | 3/1950 | Wolfe | D90/12 |
| D. 238,422 | 1/1976 | Stults | D12/213 |
| 652,481 | 6/1900 | Hyder | 301/37 S |
| 1,193,717 | 8/1916 | Putnam | 301/63 |
| 1,476,732 | 12/1923 | Smith | 280/274 |
| 1,492,438 | 4/1924 | Druckenmueller | 301/37 |
| 1,878,528 | 9/1932 | Kraeft . | |
| 2,344,542 | 3/1944 | Fike | 88/81 |
| 2,358,468 | 9/1944 | Mulhern | 301/37 R |
| 2,447,428 | 8/1948 | O'Leary | 301/38 |
| 2,650,862 | 9/1953 | Lyon | 301/37 CM |
| 3,004,798 | 10/1961 | Tylle | 301/37 P |
| 3,178,231 | 4/1965 | Hezler, Jr. | 301/37 |
| 3,356,421 | 12/1967 | Trevarrow, Jr. | 301/37 S |
| 3,565,489 | 2/1971 | Eirinberg et al. | 301/37 |
| 3,567,285 | 3/1971 | Faurot | 301/37 |
| 3,602,550 | 8/1971 | Patane | 301/37 S |
| 3,847,443 | 11/1974 | Laurion | 301/37 R |
| 3,894,775 | 7/1975 | Christoph et al. | 301/37 |
| 3,987,409 | 10/1976 | Freeman | 340/134 |
| 4,202,582 | 5/1980 | Seltman | 301/37 SA |
| 4,209,230 | 6/1980 | Perkins | 350/99 |
| 4,418,962 | 12/1983 | Schaffer | 301/37 P |
| 4,620,749 | 11/1986 | McEachern | 301/37 SA |

OTHER PUBLICATIONS

Amer. Bicyclist & Motorcyclist, Oct. 1962, p. 35.

Primary Examiner—Robert B. Reeves
Assistant Examiner—Russell D. Stormer
Attorney, Agent, or Firm—Biebel, French & Nauman

[57] ABSTRACT

A wheel shroud for substantially covering and enclosing a spoked portion of a bicycle wheel which includes a pair of identical shroud members, each of which is disk-shaped and has a central aperature for receiving a wheel hub, an outer periphery sized to extend to a wheel rim, and a valve stem opening formed adjacent to the outer periphery having a reinforcing rib about its periphery which extends inwardly. The reinforcing ribs of the shroud members are shaped to form a through passage having a substantially closed wall which not only strengthens the shroud members in that area but prevents contaminants from entering an interior portion of the shroud. The shroud members also include pairs of opposing recesses having bottom walls that abut each other, when the shroud members are mounted on a wheel, to form spacer elements which space the outer peripheries of the shroud members an appropriate distance apart. Nuts and bolts extend through the recesses to clamp the shroud members together to enclose the spoked portion of a bicycle wheel. Each shroud member includes a reflector having an opening sized to receive a bolt for attachment to the shroud member.

10 Claims, 6 Drawing Figures

BICYCLE WHEEL SHROUD

BACKGROUND OF THE INVENTION

The present invention relates generally to shrouds for covering spoked bicycle wheels, and more particularly, to a plastic shroud for a spoked wheel which provides access to a valve stem and facilitates securing a reflector to the wheel.

A variety of shrouds and covers for the spoked wheels of bicycles, tricycles and the like have been used for safety reasons and to enhance the aesthetic appeal of the associated vehicle. For example, U.S. Pat. Nos. 3,004,798, 3,602,550 and 4,202,582 disclose a variety of covers for enshrouding spoked wheels. The covers disclosed in those patents do not provide access to the valve stem of the wheel to which they are applied. Consequently, if the spoked wheel and shroud is used with a pneumatic tire, the covers must be partially or totally removed from the wheels in order to add air to the tires.

A shroud for a spoked wheel which, to a limited extent, overcomes the problems associated with filling a tire mounted on the wheel is disclosed in U.S. Pat. No. 4,418,962. That patent discloses one of a pair of wheel covers having an opening formed to receive a bent valve stem extension which can be secured to the valve stem of the associated tire. While the use of the bent valve stem extension may permit the tire to be filled without removing the cover, it cannot be assured that the valve stem extension can be secured to the valve stem of a bicycle wheel such that it extends at right angles thereto for assembly of the wheel cover and still properly seal the valve stem. Furthermore, the provision of a bent valve stem extension adds to the cost of providing such shrouds and increases the time required to attach the shroud to the wheel. It is also noted that none of the shrouds of the cited patents disclose a convenient way of securing a reflector to the cover to add to the visibility of the associated bicycle.

It is therefore apparent that a need exists for an improved spoked wheel shroud which substantially covers the spokes, provides access to the valve stem of a bicycle wheel to which the covers are mounted, and also facilitates the use of wheel reflectors.

SUMMARY OF THE INVENTION

The present invention is a wheel shroud which substantially covers and encloses both sides of the spoked portion of a bicycle wheel but permits access to the valve stem of an associated tire through an opening in the shroud. The opening is surrounded by a wall which substantially seals the interior of the shroud to prevent contaminants from entering the interior of the shroud through the holes. The wheel shroud of the present invention is secured to a spoked wheel by means of nut and bolt fasteners which are recessed from the outer surface of the shroud. At the same time, these fasteners permit easy assembly and provides a rugged appearance, characteristic of a BMX bicycle, for both sides of the wheel.

In a preferred embodiment, the wheel shroud includes two identical shroud members, each consisting of a frusto-conical disk having a plurality of recesses spaced about its periphery which include holes that receive the fasteners. The bottom wall of each recess acts as both a fastener retaining wall and as one half of a spacing element which abuts the bottom wall of corresponding recess of the opposing shroud member to space the shroud members the appropriate distance from each other at that location.

The wheel shroud of the present invention preferably includes a reflector which is secured to the shroud by one of the fasteners. The reflector includes a hole sized to receive a fastener bolt, so that the reflectors may be mounted on the shroud by the same fastener that joins the shroud members.

It is therefore an object of the present invention to provide a wheel shroud for substantially covering the spoked portion of a bicycle wheel which permits direct access to a valve stem of a tire associated with the wheel, yet seals the access opening in the shroud to prevent contaminants from entering the shroud adjacent the valve stem; a wheel shroud having integral spacer elements positioned about its periphery for spacing the shroud members apart on appropriate distance; and a wheel shroud having reflectors attachable to the shroud members by the fasteners that join the shroud members together.

Other objects and advantages of the present invention will be apparent from the following description, the accompanying drawings and the appended claims.

DETAILED DESCRIPTION OF THE PREFERRED EMBODIMENT

Figure 1:
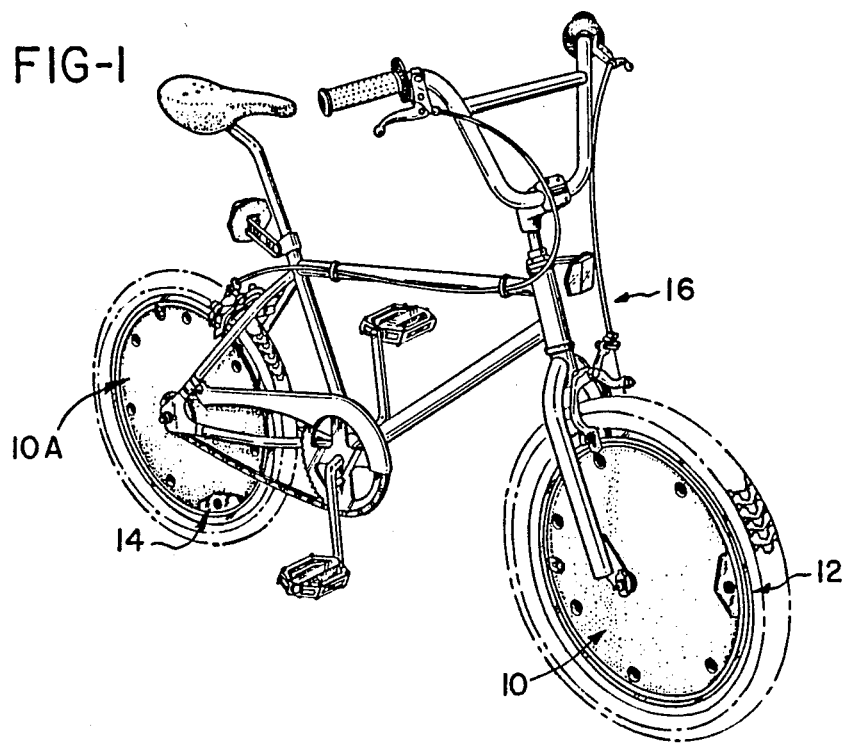
FIG. 1 is a perspective view of a bicycle having front and rear wheel shrouds of the present invention.
Figure 6:
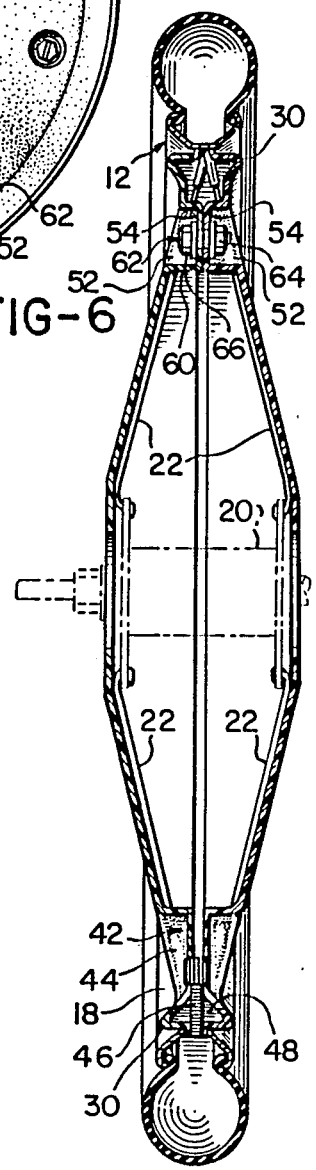
FIG. 6 is a full side section of the wheel shroud of FIG. 2.

As shown in FIG. 1, wheel shrouds 10, 10A of the present invention are mounted upon the front and rear wheels 12, 14 of a conventional bicycle 16. As shown in FIG. 6, the wheels 12, 14 each include a rim 18, a hub 20, and a spoked portion 22 extending from the hub to the rim.

Figure 2:
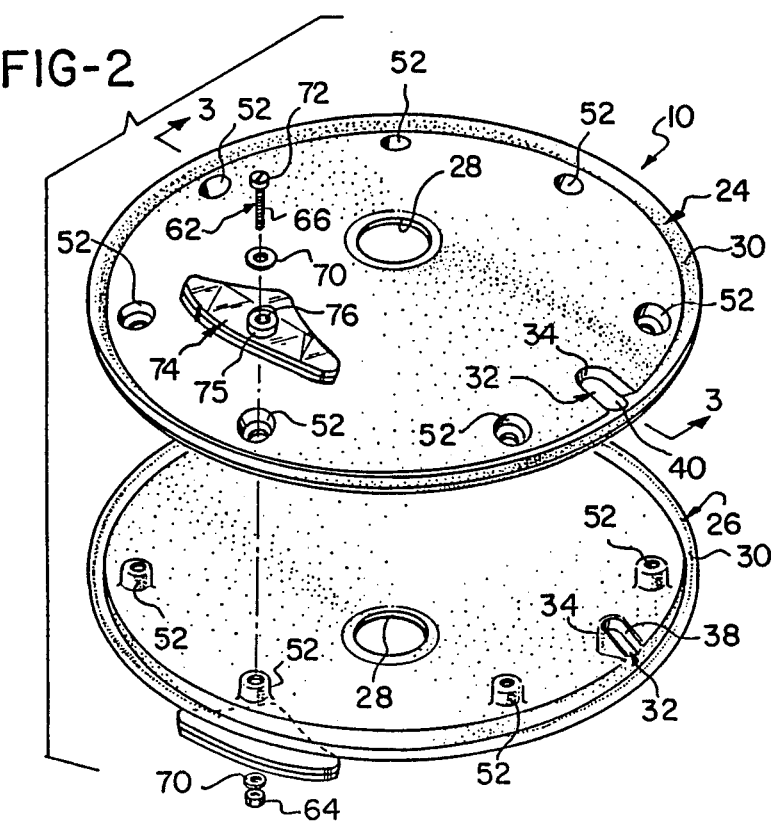
FIG. 2 is a perspective, exploded view of the front wheel shroud shown in FIG. 1.
Figure 3:
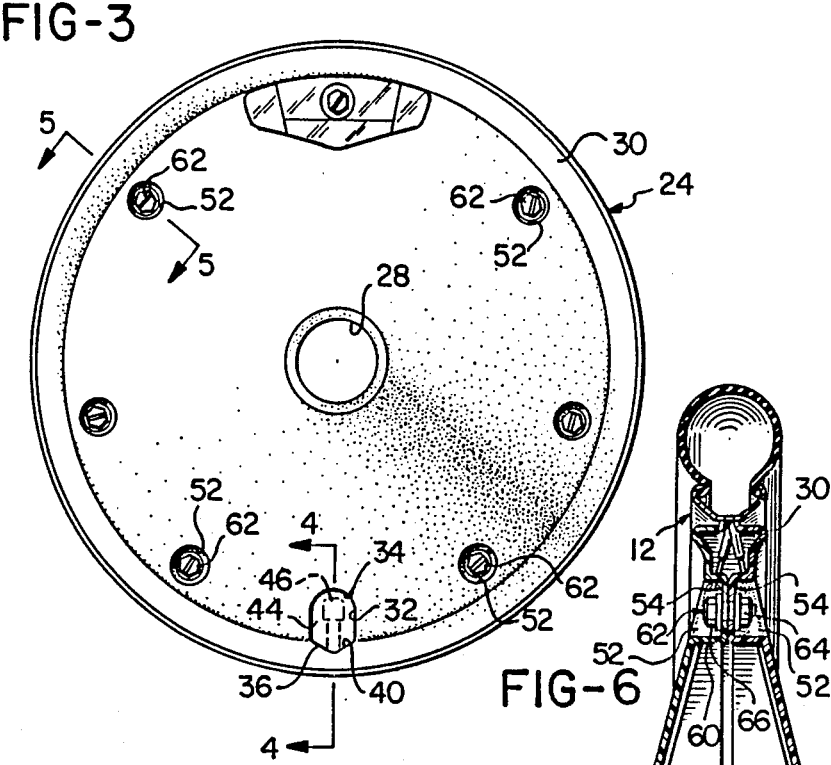
FIG. 3 is a front elevation of a a shroud member of the shroud shown in FIG. 2.

As shown in FIGS. 2 and 3, each wheel shroud 10, 10A includes a pair of identical, one-piece shroud members 24, 26, preferably made of plastic, such as PVC (polyvinyl chloride). The shroud members 24, 26 each include a central aperture 28 for receiving the hub 20 of a wheel, and a raised, peripheral ridge 30 which is positioned to lie adjacent to the rim 18 of the wheel. The front and rear shrouds 10, 10A differ only in that the diameter of the apertures 28 of the rear shroud is greater than that of the front shroud apertures, in order to accommodate the larger diameter rear hub. Accordingly, the following discussion will be directed to the front shroud 10, it being understood that the discussion applies to the rear shroud 10A as well.

Figure 4:
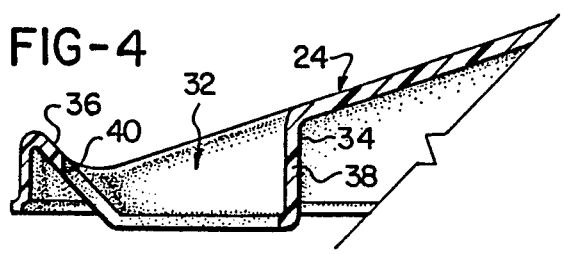
FIG. 4 is a detail side elevation taken at line 4—4 of FIG. 3.

The shroud members 24, 26 are frusto-conical in shape, having a contour which generally follows the frusto-conical shape of the spoked portion 22 of the wheel to which it is attached. As shown in FIGS. 2, 3 and 4, each shroud member 24, 26 includes a valve stem opening, generally designated 32, which is positioned on the periphery of the shroud member adjacent to the ridge 30. The contour of the valve stem opening 32 includes a U-shaped portion 34 and a radially outward portion 36, which bridges the open end of the U-shaped portion. The U-shaped portion 34 includes an inwardly extending reinforcing rib 38 about its periphery, and the radially outward portion 36 includes a notch 40.

As best shown in FIG. 6, the reinforcing ribs 38 of the shroud members 24, 26 cooperate to form a substantially closed wall 42 which defines a through passage 44. A valve stem 46 extends through the rim 18 of wheel 12 and into the through passage 44 through an opening 48 defined by the notches 40. The passage 44 in sized such that the valve stem can be connected to an air hose (not shown) from either side of the wheel 12.

Accordingly, the wall 42 performs two functions. First, it strengthens the shroud elements 24, 26 in this area to prevent cracks formed by wear and impact from pressure hoses inserted into the opening 44 to engage the valve stem 46. Second, the wall 42 acts to prevent contaminants from entering the interior portion 50 of the shroud 10. The through passage is sized to provide ready access to the valve stem 46 from either side of the wheel 12. Due to the frusto-conical shape of the shroud members 24, 26, the reinforcing ribs 38 taper in thickness as they extend radially outwardly toward the outward portions 36 of the valve stem openings 32.

Figure 5:
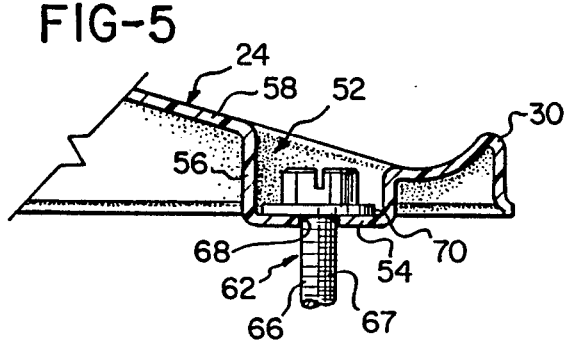
FIG. 5 is a detail side elevation taken at line 5—5 of FIG. 3.

The shroud members 24, 26 each include a plurality of recesses, generally designated 52, which are evenly spaced about the peripheries of the members adjacent to the peripheral ridges 30. As shown in FIG. 5, each recess 52 includes a bottom wall 54 and a continuous side wall 56 which attaches the bottom wall to the outer surface 58 of the shroud members. The recesses 52 are positioned such that, when the shroud members 24, 26 are mounted on a bicycle wheel 12 as shown in FIGS. 1 and 6, the bottom walls 54 of the recesses are grouped in opposing pairs. The recesses 52 are sized such that the bottom walls 54 of each opposing pair of recesses abut each other and together form a spacer element 60, which spaces the periphery of the shroud members 24, 26 an appropriate distance apart.

The shroud members 24, 26 are joined together by fasteners 62 (see also FIGS. 2, 3 and 5) which include pairs of nuts and bolts 64, 66. The threaded shanks 67 of the bolts 66 extend through holes 68 formed in the bottom walls 54 of the recesses 52. For the sake of appearance, and to provide a strong connection, the fasteners 62 include washers 70 which are positioned between the heads 72 of the bolts and the bottom walls 54, and the nuts 64 and the bottom walls.

A pair of reflectors, each generally designated 74, are attached to the shroud members 24, 26 by a selected fastener 62, as shown in FIGS. 1, 2, and 3. Each reflector 74 includes a hole 76 which receives the shank 67 of a selected bolt 66. The reflectors 74 are secured to the shroud 10 by a common bolt so that the head and associated washer 70 clamps one reflector 74, and the nut and associated washer 70 clamps the other. Each reflector 74 has a flat 75 surrounding its hole 76 which seats an associated washer. The reflectors 74 include arcuate radial outer edges 78 which contact the ridge 30 when the reflectors are bolted into place. This contact prevents the reflectors from rotating relative to the shrouds and thereby eliminates the need for additional means of attachment.

The method of attachment and removal of the wheel shroud 10 is as follows. The shroud members 24, 26 are first positioned on either side of the spoked portion 42 of a wheel 12, and rotated relative to each other until the valve stem openings 32 are brought into registry with each other (this automatically brings the recesses 52 into registry with each other). While the shroud members 24, 26 are held in this position, the bolts 66 (after receiving washers 73) are inserted into pairs of opposing holes 70 of the recesses 52. Additional washers 73 are placed on the shanks 68 of the bolts 66, and the nuts 64 are tightened down on the bolts.

With the last bolt, reflectors are positioned adjacent to the shroud members 24, 26 such that their holes 76 are in registry with the recesses 52. A nut and bolt 64, 66 are attached to clamp the reflectors 74 against the shroud members 24, 26.

While the form of apparatus herein described constitutes a preferred embodiment of the invention, it is understood that the invention is not limited to this specific form of apparatus, and that changes may be made therein without departing from the scope of the invention.

What is claimed is:

1. A wheel shroud for substantially covering and enclosing the spoked portion of a bicycle wheel comprising:

a pair of identical shroud members sized to engage opposite sides of a spoked portion of a wheel, each of said members being disk-shaped and having a central aperture for receiving a wheel hub therethrough, an outer periphery sized to extend to a wheel rim, and a valve stem opening formed adjacent to said outer periphery, said opening including a U-shaped portion and a radially outward portion having a notch shaped to allow a rectilinear valve stem to extend therethrough and terminate on said opening such that access is available to said valve stem from both sides of said bicycle wheel;

a reinforcing rib extending inwardly from a periphery thereof, said ribs of said shrouds being shaped such that, when said shroud members are joined together to engage a wheel, said ribs cooperate to form a wall between said valve stem opening and an interior portion between said shroud members, whereby said wall prevents contaminants from entering an interior portion between said shroud members; and means for joining said pair of shroud members together such that said valve stem openings are in registry and said shroud members clamp a spoked portion of a wheel therebetween.

2. The wheel shroud of claim 1 wherein said joining means includes a plurality of fasteners attached to and extending between said shroud members.

3. The wheel shroud of claim 1 wherein said shroud members include a plurality of integral recesses positioned such that said recesses of one of said pair of shroud members are in registry with said recesses of the other of said shroud members, said recesses having bottoms shaped such that said bottoms of opposing recesses abut, when said shroud is mounted on a wheel, to form spacer elements spacing said shroud members an appropriate distance apart.

4. The wheel shroud of claim 3 wherein said joining means includes a plurality of fasteners extending through opposing pairs of said recesses.

5. The wheel shroud of claim 4 wherein said fasteners each include a bolt extending through said bottoms of an opposing pair of said recesses, and a nut threaded on said bolt.

6. The wheel shroud of claim 5 further comprising reflector means attached to said shroud members by said joining means.

7. The wheel shroud of claim 6 wherein said reflector means includes at least one reflector having a hole therethrough for receiving said bolt.

8. The wheel shroud of claim 7 wherein said reflector means includes an arcuate radial outer surface, and said shroud members each include a peripheral ridge engaging said outer surface, thereby preventing rotation of said reflector means relative to said shroud member.

9. The wheel shroud of claim 3 wherein said recesses each include continuous side walls supporting an associated one of said bottom walls.

10. A wheel shroud for substantially covering and enclosing a spoked portion of a bicycle wheel comprising:

a pair of identical shroud members sized to engage opposite sides of a spoked portion of a wheel such that said spoked portion is enclosed within an interior portion of said shroud formed by said shroud members, each of said members being frusto-conical in shape and having a central aperture for receiving a wheel hub therethrough, an outer periphery sized to extend to a wheel rim and including a peripheral ridge, a valve stem opening formed adjacent to said outer periphery, said opening including a U-shaped portion and a radially outward portion having a notch shaped to allow a rectilinear valve stem to extend therethrough and terminate in said opening such that access is available to said valve stem from both sides of said bicycle wheel and a reinforcing rib extending inwardly from a periphery of said opening and shaped to cooperate with said rib of an opposing one of said shroud members to form a through passage having a substantially closed wall to prevent contaminants from entering said interior portion, and a plurality of integral recesses positioned such that said recesses of one of said pair of shroud members are in registry with said recesses of the other of said shroud members, said recesses having bottom walls shaped such that said bottom walls of opposing recesses abut, when said shroud is mounted on a wheel, to form spacer elements spacing said shroud members an appropriate distance apart;

a plurality of fasteners joining said shroud members together, each of said fasteners including a bolt extending through one pair of said opposing bottom walls and a nut threaded on said bolt; and at least one reflector having a hole therethrough sized to receive one of said bolts for attachment of said reflector to one of said shroud elements, said reflector having an arcuate radial outer surface shaped to engage said ridge and thereby prevent rotation of said reflector relative to an associated one of said shroud members.

* * * * *